(12) United States Patent
Agbor et al.

(10) Patent No.: US 10,315,682 B2
(45) Date of Patent: Jun. 11, 2019

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Thomas Agbor, St. Gallen (CH); Thomas Geiselberger, Carmel, IN (US); Johannes Ganahl, Schruns (AT); Martin Fleischer, Balgach (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 33 days.

(21) Appl. No.: 15/556,876

(22) PCT Filed: Mar. 10, 2016

(86) PCT No.: PCT/EP2016/055169
§ 371 (c)(1),
(2) Date: Sep. 8, 2017

(87) PCT Pub. No.: WO2016/142482
PCT Pub. Date: Sep. 15, 2016

(65) Prior Publication Data
US 2018/0050719 A1   Feb. 22, 2018

(30) Foreign Application Priority Data
Mar. 12, 2015  (DE) .......................... 10 2015 204 476

(51) Int. Cl.
*B62D 1/19*   (2006.01)
*B62D 1/184*  (2006.01)
(Continued)

(52) U.S. Cl.
CPC ............. *B62D 1/184* (2013.01); *B62D 1/185* (2013.01); *B62D 1/187* (2013.01); *B62D 1/195* (2013.01)

(58) Field of Classification Search
CPC ........ B62D 1/184; B62D 1/185; B62D 1/187; B62D 1/19; B62D 1/195
See application file for complete search history.

(56) References Cited

U.S. PATENT DOCUMENTS 6,419,269 B1 *   7/2002  Manwaring ............ B62D 1/184
                                                    280/775
6,971,676 B2 * 12/2005  Lange .................... B62D 1/195
                                                    280/775
(Continued)

FOREIGN PATENT DOCUMENTS

CN          203511751 U       4/2014
CN          203920877 U      11/2014
(Continued)

OTHER PUBLICATIONS

English Translation of International Search Report issued in PCT/EP2016/055169, dated May 11, 2016 (dated May 18, 2016).

*Primary Examiner* — Laura Freedman
(74) *Attorney, Agent, or Firm* — thyssenkrupp North America, Inc.

(57) ABSTRACT

A steering column may include a steering spindle mounted rotatably about its longitudinal axis in an inner casing tube. An outer casing unit in which the inner casing tube is held may be directly or indirectly connectable to a body of a motor vehicle. A clamping device in a fixing position affixes the outer casing unit relative to the inner casing tube. In a release position, the clamping device permits adjustment of the inner casing tube relative to the outer casing unit at least in a longitudinal direction. The clamping device may have at least one locking part for prohibiting or permitting move- (Continued)

ment between the inner casing tube and the outer casing unit. The inner casing tube and the outer casing unit may be coupled by an energy absorption device that has at least two energy absorption elements that are plastically deformed in the event of displacement between the inner casing tube and the outer casing unit.

9 Claims, 3 Drawing Sheets

(51) Int. Cl.
  *B62D 1/185* (2006.01)
  *B62D 1/187* (2006.01)

(56) References Cited

U.S. PATENT DOCUMENTS

| | | | | |
|---|---|---|---|---|
| 7,188,867 | B2* | 3/2007 | Gatti | B62D 1/195 |
| | | | | 280/777 |
| 7,484,430 | B2* | 2/2009 | Schulz | B62D 1/184 |
| | | | | 280/777 |
| 7,963,561 | B2* | 6/2011 | Waibel | B62D 1/195 |
| | | | | 280/777 |
| 8,438,944 | B2* | 5/2013 | Ridgway | B62D 1/195 |
| | | | | 280/775 |
| 8,678,437 | B2* | 3/2014 | Narita | B62D 1/184 |
| | | | | 188/371 |
| 9,428,213 | B2* | 8/2016 | Tinnin | F16F 7/128 |
| 9,616,914 | B2* | 4/2017 | Stinebring | B62D 1/181 |
| 9,663,136 | B2* | 5/2017 | Stinebring | B62D 1/195 |
| 9,969,421 | B2* | 5/2018 | Klepp | B62D 1/195 |
| 10,023,222 | B2* | 7/2018 | Tinnin | B62D 1/192 |
| 2007/0194563 | A1 | 8/2007 | Menjak et al. | |
| 2011/0115206 | A1 | 5/2011 | Sulser et al. | |
| 2012/0266716 | A1 | 10/2012 | Sulser et al. | |
| 2015/0314801 | A1 | 11/2015 | Gstohl et al. | |
| 2015/0375767 | A1 | 12/2015 | Agbor et al. | |
| 2016/0159387 | A1* | 6/2016 | Okano | B62D 1/184 |
| | | | | 74/493 |
| 2018/0037250 | A1* | 2/2018 | Kreutz | B62D 1/184 |
| 2018/0265116 | A1* | 9/2018 | Sulser | B62D 1/184 |
| 2018/0297626 | A1* | 10/2018 | Huber | B62D 1/192 |

FOREIGN PATENT DOCUMENTS

| | | |
|---|---|---|
| DE | 102008034807 B | 10/2009 |
| DE | 102009059159 B | 1/2011 |
| DE | 102012111890 | 12/2013 |
| DE | 102013101045 | 5/2014 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2016/055169, filed Mar. 10, 2016, which claims priority to German Patent Application No. DE 10 2015 204 476.9 filed Mar. 12, 2015, the entire contents of both of which are incorporated herein by reference.

FIELD

The present disclosure generally relates to steering columns, including steering columns for motor vehicles that occupy less structural space.

BACKGROUND

For adjusting a steering wheel position to a sitting position of a driver of a motor vehicle, steering columns are known in various embodiments in the prior art. In addition to a height adjustment by adjusting the tilt of the steering column, the steering wheel mounted to a rear end of the steering spindle in generic steering columns can be positioned in the vehicle interior by a length adjustment in the direction of the steering column longitudinal axis.

The length adjustability is realized by the adjustment unit, which consists of a casing unit and a casing tube, wherein the inner casing tube comprises the rotatably mounted steering spindle, which casing tube is adjustable in the longitudinal direction in the manner of a telescope and is fixable, i.e., releasably securable, in various longitudinal positions by means of a releasable clamping device. The clamping device, also called a securing device, acts on an outer casing unit held on the body, wherein, in the opened state of the clamping device, which is also synonymously called the release position or unclamping position, a displacement of the inner casing tube in the outer casing unit to adjust the steering wheel position is possible and, in the closed state—the fixing position or securing position—the inner casing tube is clamped in the outer casing unit, and the steering wheel position is fixed in normal driving operation under the mechanical loads to be expected.

As an effective measure for improving the safety of occupants in a vehicle collision—the so-called crash event—in which the driver hits the steering wheel at high speed, it is known to design the steering column to be collapsible in the longitudinal direction, even in the fixing position of the clamping device, when a high force which exceeds a limit value that only occurs in the event of a crash is exerted on the steering wheel. In order to ensure a controlled deceleration of a body hitting the steering wheel, an energy absorption device is coupled in between the outer casing unit and the inner casing tube, which are affixed to one another by the clamping device in normal operation, but can be collapsed relative to one another in the event of a crash. This converts the introduced kinetic energy into a plastic deformation of an energy absorption element—for example, by ripping open a tear flap or bending an elongated bending element, such as a bending wire or bending strip.

A generic steering column is described in DE 10 2008 034 807 B3. The clamping device described therein comprises a locking part on the outer casing unit, which locking part can be engaged transversely to the longitudinal direction in a force-fitted and form-fitted manner with a corresponding engagement part on the inner casing tube in the fixing position. In the release position, the locking part is lifted off the engagement part, i.e., released, so that the inner casing tube can be displaced in the longitudinal direction to adjust the steering wheel position.

The engagement part is connected to the inner casing tube by way of an energy absorption device, which is not loaded in normal operation, i.e., forms a rigid connection between the outer casing unit and the inner casing tube. In the event of a crash, however, such a high force is introduced by way of the locking part that the outer casing unit and the inner casing tube move toward each other in the longitudinal direction, wherein the energy absorption element is deformed and the movement is decelerated as a result.

Said DE 10 2008 034 807 B3 furthermore suggests to design the braking effect of the energy absorption device to be controllable in order to, in the event of a crash, take into account whether or not the driver is buckled up, or to be able to adapt to parameters such as the driver's weight, distance to the steering wheel, and the like. In detail, at least two energy absorption elements are, for this purpose, to be provided, which can be activated as needed by coupling them in between the outer casing unit and the inner casing tube, i.e., by their being able to be brought as described above into a mechanical operative connection between the engagement part and the inner casing tube. In doing so, at least a first or a second energy absorption element can be coupled in between the inner casing tube and the engagement part, i.e., either the first or the second or both energy adsorption elements. In this way, an individual braking characteristic adapted to the respective requirement, i.e., a crash degree or crash level, can be realized.

Disadvantageous in the previously known energy absorption device is, however, that the individual energy absorption elements are arranged on respective separate mounting units on opposite sides of the inner casing tube. As a result, a relatively large structural space is taken up, which limits the flexibility in the integration into a vehicle body. On the other hand, the manufacture and separate mounting of at least two energy absorption elements, including the respectively required mounting means, are complex and correspondingly cost-intensive, due to the high number of required components.

Thus a need exists for a steering column with at least two crash degrees, which steering column takes up a smaller amount of structural space and permits an easier and cheaper manufacture.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering column for a motor vehicle. In some examples, a steering column may comprise a steering spindle mounted rotatably about its longitudinal axis in an inner casing tube, an outer casing unit in which the inner casing tube is held and which is connectable to the body of a motor vehicle, and a clamping device that in a fixing position affixes the outer casing unit relative to the inner casing tube and that in a release position permits an adjustment of the inner casing tube relative to the outer casing unit at least in a longitudinal direction. The clamping device may have at least one locking part, which is supported in the longitudinal direction on the outer casing unit and which, in the fixing position, is connected non-displaceably in the longitudinal direction to an engagement part connected to the inner casing tube and which, in the release position, is released from the engagement part and permits a relative movement of the inner casing tube relative to the outer casing unit in the longitudinal direction. The inner casing tube and the outer casing unit are coupled by way of an energy absorption device, which has at least two energy absorption elements, of which at least a first or a second energy absorption element can be coupled in between the inner casing tube and the engagement part. The energy absorption element, in the coupled-in state in the fixing position of the clamping device, may be plastically deformed in the event of a relative displacement of the inner casing tube and the outer casing unit.

In order to solve the drawbacks of prior art steering columns, steering columns may include first and second energy absorption elements positioned in a radial direction with respect to a longitudinal axis on a same side of an inner casing tube.

According to the invention, the first and second energy absorption elements are not arranged, as in the prior art, at separate positions on different sides of the casing tube, but combined on a single side of the inner casing tube. In other words, the at least two energy absorption devices previously required for the realization of different crash degrees are combined according to the invention with one energy absorption element each, which must be produced separately and mounted on opposite sides of the steering column, into a single integrated energy absorption device with at least two crash degrees.

The energy absorption device according to the invention has at least two energy absorption elements, which can be activated individually or together as needed. The activation can take place by coupling one energy absorption element in between the inner casing tube and the engagement part, i.e., a mechanical operative connection is created between the energy absorption element and the casing tube and the engagement part, by means of which mechanical operative connection the energy absorption element is inserted into the force fit between the casing tube and the engagement part such that a relative displacement of the inner casing tube and the engagement part brings about a deformation of the energy absorption element, and thus an energy absorption. As a result, the inner casing tube is decelerated in a controlled manner relative to the outer casing unit, which is connected to the engagement part by way of the locking part. The crash degree or the magnitude of the deceleration can be increased by a controlled coupling-in of energy absorption elements and, conversely, decreased by an uncoupling.

A particular advantage of the invention is that at least the said two, and possibly more, energy absorption elements can be combined structurally in an energy absorption device according to the invention into an integrated unit, which, as a whole, can be mounted on one side of the casing tube or the steering column. By the combination into an integrated unit, components can, in comparison to the separate design known in the prior art, be spared, e.g., mounting elements for connecting the energy absorption elements to the engagement part and the inner casing tube. The manufacture expenditures and costs can be reduced thereby. In addition, a particularly compact construction of an energy absorption device with two or more crash degrees is made possible, which construction requires a smaller amount of structural space than in the prior art.

An advantageous embodiment of the invention provides that the first and the second energy absorption elements be arranged in a radial direction with respect to the longitudinal axis in a sandwich-like manner, one above the other, or one adjacent to the other. In this construction, two or more energy absorption elements are arranged in the form of a stack, one above the other, or one next to the other, and form a particularly compact assembly.

Alternatively, it is also conceivable and possible that two or more energy absorption elements be arranged one behind the other in the direction of the longitudinal axis. A smaller structural height in the radial direction can be realized thereby.

Preferably, the at least two energy absorption elements are arranged in a common housing. The housing forms a part of the energy absorption device according to the invention, which part encloses the energy absorption elements at least partially and protects them against disturbances. Furthermore, mounting elements for the energy absorption elements, longitudinal guides for the engagement part, and the like can be formed in or on the housing.

In an advantageous construction, a separating element is arranged between the energy absorption elements. A separating element can, for example, be formed by a separating wall or a separating plate inserted between adjacent energy absorption elements. As a result, adjacent energy absorption elements are shielded against each other in a functionally reliable manner, so that the function of an energy absorption element cannot be affected by adjacent energy absorption elements. This proves advantageous for increased operational safety and functional reliability.

One embodiment of the invention provides that at least one of the energy absorption elements be designed as an elongated bending element, which has two legs connected to each other by way of a bend, wherein the one leg can be affixed to the engagement part, and the other leg can be supported in the longitudinal direction on the inner casing tube. It is known to use as an energy absorption element a bending wire or binding strip that is designed to be U-shaped by means of a bend of approximately 180°, wherein the legs extend substantially parallel to the longitudinal direction, wherein the term "substantially parallel" means a deviation with a solid angle of ±10°. The end of the one leg is connected to the inner casing tube with respect to a movement in the longitudinal direction—for example, by being supported on a stop or counter bearing in the event of a crash. The other end is connected to the engagement part for coupling-in, e.g., by inserting a pin-shaped coupling element or carrier, which carries said end in the longitudinal direction in the event of a crash. In a relative displacement of the two ends in the event of a crash, the bend moves across the longitudinal extent of the bending element, wherein kinetic energy is converted or absorbed by the deformation work. According to the invention, two or more elongated bending elements can be arranged as described above in the radial direction in the form of a stack, one above the other.

A bending strip in the embodiment described above extends with its bend parallel to a plane, which means that the U-shaped extent lies in one plane or parallel to a plane. The center line of the longitudinal extent of the bending strip accordingly lies in a strip plane. In other words, the bending of the bending strip takes place in the shape of an arc by an angle of preferably 180° about a bending axis, which forms the center of the arc-shaped bend and is aligned orthogonally to the strip plane, and thus extends parallel to the surface normal of the strip plane. The surface normal extends transversely—preferably, orthogonally—to the longitudinal axis. The surface normal preferably intersects the longitudinal axis. Between the legs and the bend, an engagement opening of an energy absorption element is respectively formed.

According to the invention, at least two bending strips can be arranged, one next to the other, in the form of a stack, orthogonally to this strip plane, so that two bending strips with their strip planes are aligned in parallel and spaced apart from one another. In this case, the bending strips are preferably arranged such that their bending axes relative to one another are located on one line, i.e., in the direction of this surface normal. As a result, the bending strips are stacked one above the other such that they lie with their engagement openings at least partially congruently one above the other. Thus, a carrier pin can, for example, in the direction of the surface normal, reach through or be immersed in the engagement openings of energy absorption elements stacked one above the other according to the invention.

In order to realize the arrangement explained above, it can be provided that the energy absorption elements be arranged in a radial direction with respect to the longitudinal axis in a sandwich-like manner, one adjacent to the other, wherein the bend of the bending strips respectively extends parallel to a plane to which the bending strips are arranged orthogonally, one next to the other, in the form of a stack. As a result of this stack-shaped arrangement of the bending strips orthogonally to the plane of their respective bend, the deformation of the one bending strip does not affect the deformation of the respective other bending strip. Thus, a sandwich-like, stack-shaped arrangement of two or more bending strips can be provided, in which arrangement no undesired mutual influence of the energy absorption behavior of the bending strips takes place.

It is furthermore advantageous that at least one bending element and/or the housing and/or the separating element is/are provided with an anti-friction coating. This ensures that the deformation of the bending wire or bending strip in the event of a crash takes place smoothly and is not impeded by friction or jamming when parts of the bending elements come into contact with one another or with surrounding components, such as the housing. The functional reliability is thereby increased.

In another advantageous embodiment, an inner profile is included in the housing. This inner profile is arranged at least partially between the bending wire or bending strip and the housing. In doing so, the inner profile serves for easier mounting of the bending wires or bending strips in the housing, before the housing is affixed to the inner casing tube. The inner profile preferably consists of a spring steel sheet—for example, of the steel grade C75S.

One embodiment of the invention provides that the energy absorption device have an adjustment device with a movable coupling element, which couples or decouples an energy absorption element in between the inner casing tube and the engagement part when the adjustment device is activated. In order to activate or deactivate an energy absorption element in the event of a crash in a controlled manner, it is required, as described, that the energy absorption element be inserted into or removed from the force flow between the inner casing tube and the outer casing unit—specifically, between the engagement part and the inner casing tube. The connection or release can take place by moving the coupling element in the event of a crash when the adjustment device is activated, such that it, for example, locks an end of a bending element described above with the engagement part in a form-fitted manner in the longitudinal direction, or unlocks it. As a coupling element, a stop on the inner casing tube can also be moved into the operating position, or another connecting element can be locked or unlocked in the operative engagement between the energy absorption element and casing tube or/and engagement part.

It is preferably provided that the adjustment device have a pyroelectric actuator, which can be actuated to pyrotechnically drive the coupling element. A pyroelectric actuator, often also called a "pyro switch" or "pyro actuator," has a pyrotechnical propelling charge, which is ignited by an electrical pulse. The explosion of the propelling charge accelerates a movable actuator, which is connected in the present application to a coupling element. As a result, the coupling element can be engaged with or disengaged from the engagement part and the energy absorption element, or bring about a mechanical coupling of the engagement part, energy absorption element, and inner casing tube in another way. The advantages of such a pyroelectric adjustment device are the extremely fast activation in the event of a crash and the high reliability and actuating force, which ensure a safe coupling or decoupling of one or more energy absorption elements, if needed. For example, the coupling element can be designed as a pin-shaped carrier, which is inserted into form-fit recesses in order to lock the engagement part with an energy absorption element, or removed from them.

The adjustment device is preferably mounted on the energy absorption device on the side of the steering column where the energy absorption elements are arranged according to the invention.

One embodiment of the invention provides that the outer casing unit be held in a console that can be affixed to the vehicle. A particularly rigid connection of the steering column on the vehicle can thus be realized.

The casing unit is in this case preferably held on a front end of the console in a manner swivelable about a swivel axis and accommodated between two side walls of the console, wherein the casing unit can be fixed relative to the console by means of the clamping device.

By providing the swivel axis between the casing unit and the console, the adjustment of the tilt of the casing unit relative to the console can be realized. Thus, the tilt adjustment—also called height adjustment—of the casing unit can be made even easier, in contrast to mounting the casing unit directly on the vehicle by means of an axis that must be inserted through an accommodation hole of the casing unit and a corresponding accommodation section of the vehicle cross member, in order to provide the swivel axis.

Figure 1:
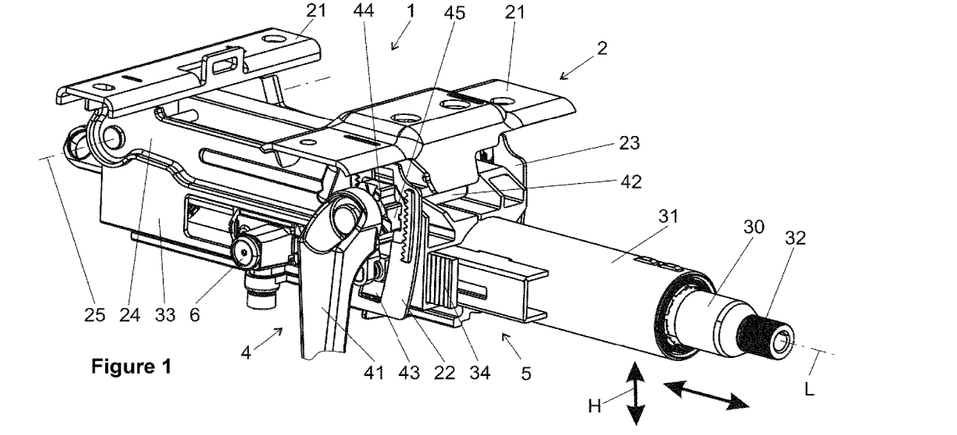
FIG. 1 is a perspective view of an example steering column.
Figure 2:
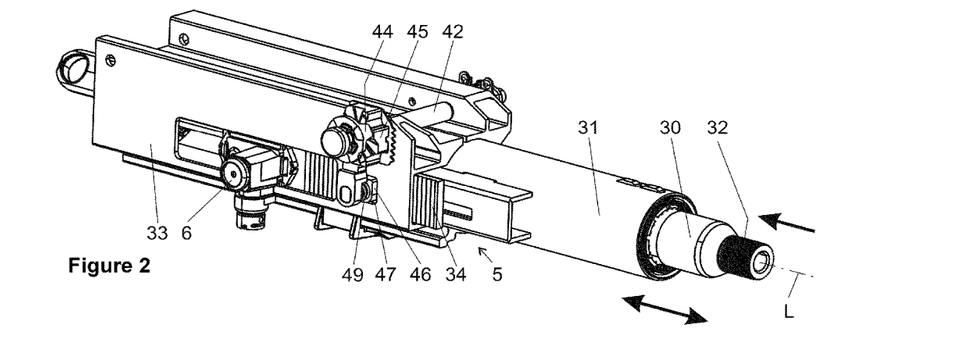
FIG. 2 is a partial view of the steering column of FIG. 1 in a normal state.
Figure 3:
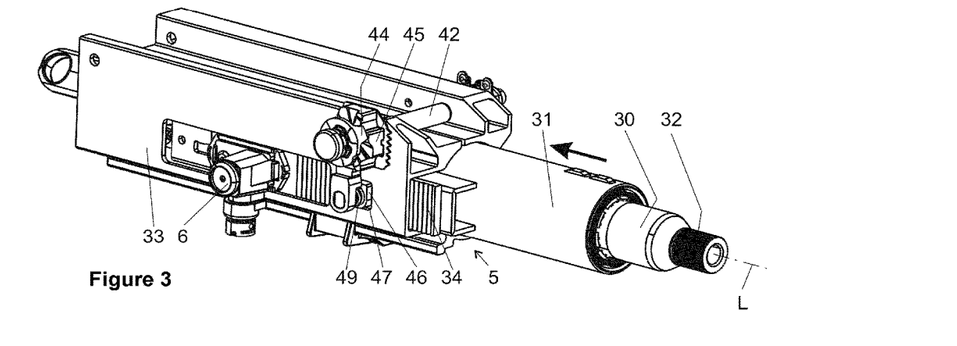
FIG. 3 is partial view of the steering column of FIG. 1 in a collapsed state after a crash event.

FIGS. 1, 2, and 3 show a steering column 1 according to the invention schematically in a perspectival view obliquely from behind (with respect to the driving direction of a motor vehicle (not shown)).

The steering column 1 can be mounted on the body of a motor vehicle (not shown) by means of a console 2, which is omitted in the views of FIGS. 2 and 3 for the sake of clarity. For the connection to the body, the console 2 has mounting means 21, from which extend side walls 22, 23 and a swing arm 24 for accommodating a swivel axis 25.

A steering spindle 30 is mounted rotatably about the longitudinal axis L in an inner casing tube 31—called casing tube 31, for short—wherein a steering wheel (not shown) can be mounted on the steering spindle 30 at the rear end 32. The inner casing tube 31 is held in an accommodation, continuous in the longitudinal direction, of an outer casing unit 33—casing unit 33, for short.

A clamping device 4 can selectively be brought into a fixing position (securing position, closed state) or a release position (unclamping position, opened state) by manual operation of a clamping lever 41. In doing so, in the release position, the inner casing tube 31 can be displaced in the manner of a telescope in the direction of the longitudinal axis L within the outer casing unit 33 in order to adjust the length, and the outer casing unit 33 can be adjusted up and down in the height direction H relative to the console 2 in the directions of the arrows. In the fixing position, the inner casing tube 31 is fixed in the longitudinal direction, and the outer casing unit 33 is fixed in the height direction H. The fixing position corresponds to the normal operation of the steering column 1, in which it is ensured that the adjusted steering wheel position is not changed when forces act on the steering spindle 30, generally by way of the steering wheel.

In detail, the clamping device 4 comprises a clamping bolt 42, which is connected in a rotationally-fixed manner to the clamping lever 41 and which is fed transversely to the longitudinal axis L through elongated holes 43 in the side walls 22, 23 located opposite one another. By means of a clamping mechanism known per se, which may comprise, as in the embodiment shown, a first cam disk 44 mounted in a rotationally-fixed manner on the clamping bolt 42 and a second cam disk 45 arranged in a rotationally-fixed manner on the side wall 22 opposite said first cam disk, the second cam disk 45 is axially shifted relative to the clamping bolt 42 in a rotation, and thus pressed from the outside against the side wall 22. By the clamping bolt 42 being mounted axially non-displaceably on the opposite side wall 23, the two side walls 22 and 23 are moved toward each other, and the outer casing unit 33 arranged between them is clamped in a force-fitted manner. Instead of the cam disks 44, 45 shown, other mechanisms can also be used to convert a rotation into a clamping movement—for example, with gravity pins or rolling bodies. During the clamping, the clamping force also compresses the outer casing unit 33 transversely to the longitudinal axis L, so that the inner casing tube 31 is clamped therein.

Figure 4:
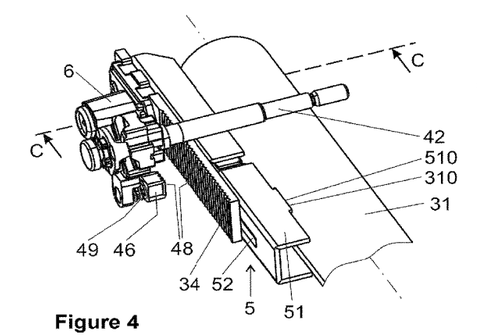
FIG. 4 is a partial view of an example clamping device according to FIGS. 1 through 4.

The clamping device 4 has a locking part 46, which is connected to the cam disk 44 by way of an interposed spring 49 and can be moved through an opening 47 in the direction toward the inner casing tube 31. If the clamping device 4 is brought into the fixing position, the locking part 46 is clamped against an engagement part 34, which is connected to the inner casing tube 31 by way of an energy absorption device 5 according to the invention. On their contact surfaces facing each other, the locking part 46 and the engagement part 34 can have teeth 48 corresponding to one another or similar surface structures 48, which ensure a form-fitted connection in the event of a clamping, as can be clearly seen in the exploded view of FIG. 4. In the case of a tooth-on-tooth situation in the corresponding teeth 48, the spring 49 ensures that the clamping device 4 can be transferred into the fixing position. The term "tooth-on-tooth situation" refers to the position of the locking part 46 relative to the engagement part 34, in which position the heads of the teeth of the locking part 46 come into contact with the heads of the teeth of the engagement part during the transferring into the fixing position. In other words, the teeth of the locking part 46 cannot engage with the corresponding space between the teeth of the engagement part 34.

The energy absorption device 5 is mounted on the inner casing tube 31 on one side, viz., in FIGS. 1 through 3 on the side facing the viewer and in FIGS. 4, 5, 8, and 9 on the left side of the casing tube 31. The energy absorption device 5 has a retaining profile 51 in the form of a U-shaped rail with a substantially rectangular cross section, which rail is firmly connected to the inner casing tube 31 and extends in the longitudinal direction, wherein the open cross-section is directed at the surface of the inner casing tube 31. By means of form-fit elements 510, which engage with corresponding accommodation openings 310 in the inner casing tube, the retaining profile 51 is firmly connected to the casing tube 31—by laser welding, for example. In this way, the retaining profile 51 together with the inner casing tube 31 forms an elongated housing of the energy absorption device 5 with a substantially rectangular inner cross section, which housing extends parallel to the longitudinal axis L on one side of the casing tube 31. On its outer side directed radially outward, the retaining profile 51 has a slot 52 extending parallel to the longitudinal axis L.

In the retaining profile 51, an also U-shaped inner profile 53 is arranged, which extends in the longitudinal direction and is open toward the outside, i.e., toward the retaining profile 51. In the inner profile 53, a first energy absorption element 54, a separating element 55, and a second energy absorption element 56 are arranged in the form of a stack, one above the other, when viewed from the longitudinal axis L. The inner profile 53 is formed from a spring steel sheet.

Figure 4A:
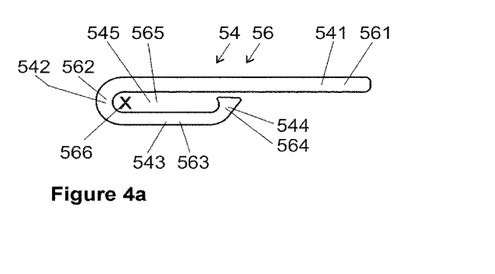

The first and the second energy absorption elements 54 and 56 are identical with respect to their basic function. As shown in FIG. 4a, the energy absorption elements 54 and 56 are designed as arc-shaped bending wires or bending strips, with a first leg 541 or 561, which is connected to a second leg 543 or 563 by way of a bend 542 or 562 of 180°. At the end of the second leg 543 or 563, a carrier hook 544 or 564 is respectively formed by a bend toward the first leg 541 or 561. Thus, an engagement opening 545 or 565 of an energy absorption element 54 or 56 is respectively formed by the legs 541, 543, the bend 542, and the carrier hook 544, and by the legs 561, 563, the bend 562, and the carrier hook 564. The energy absorption elements 54 and 56 can be designed as stamped parts, so that a cost-effective production is ensured.

The illustrations of FIGS. 5, 6, 7, 8, 9, and 10 clearly show how the energy absorption elements 54 and 56 are stacked one next to the other according to the invention, viz., such that two bending strips are respectively arranged orthogonally to the strip plane—the plane of their bend 542 or 562—in the form of a stack, one above the other, or one next to the other, i.e., in the direction of their bending axis 566. As a result, the bending strips are arranged in a stack, one next to the other, such that they lie with their engagement openings 545 and 565 at least partially congruently, one above the other. In the example, all bending axes 566 of the bending strips are on one line, which is aligned parallel to the surface normal of all strip planes. Thus, a carrier pin 63 can, for example, in the direction of the surface normal, reach through or be immersed in the engagement openings 545 565 of energy absorption elements 54 and 56 stacked one above the other according to the invention. This can, for example, be clearly taken from the sectional view of FIG. 8. In this case, the aforementioned surface normal extends in the direction of the carrier pin 63 through the engagement openings 545 and 565 parallel to the cutting line C-C drawn in FIGS. 4 and 5.

With its first leg 541 or 561, the energy absorption elements 54 and 56 are supported in the direction opposite the longitudinal direction (arrow in FIGS. 6 and 7) on a counter bearing 57, which projects inward into the cross-section of the retaining profile 51 and which forms a stop in the longitudinal direction.

The engagement part 34 is mounted on the retaining profile 51, wherein said engagement part engages together with a carrier 341 through the slot 52 with the engagement opening 546 of the energy absorption element 56. As a result, the engagement part 34 can be engaged behind the carrier hook 564 of the energy absorption element 56 in a guided manner parallel to the longitudinal axis in the retaining profile 51, and bend, i.e., plastically deform, said energy absorption element in the event of a crash.

Figure 6:
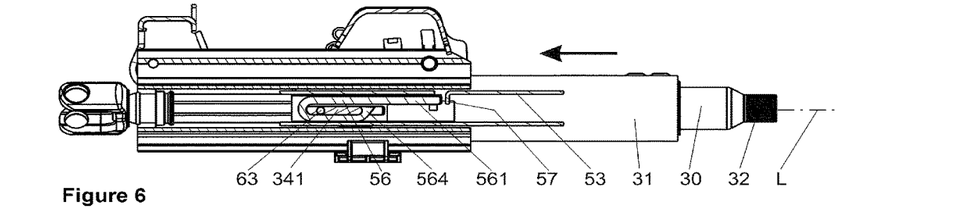
FIG. 6 is a longitudinal sectional view taken across line A-A through an energy absorption device according to FIG. 4 or FIG. 5 in a normal state.
Figure 7:
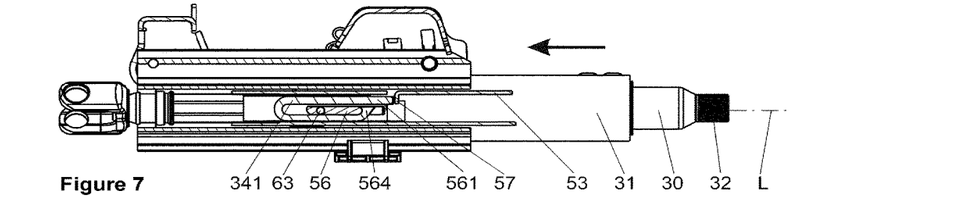
FIG. 7 is a longitudinal sectional view taken across line A-A through an energy absorption device as in FIG. 6 after a crash event.

The normal state of a steering column 1 is shown in FIGS. 1, 2, and 6, whereas FIGS. 3 and 7 show the situation after a crash event. It can be seen in this case that the inner casing tube 31 is pushed in in the longitudinal direction, indicated by the arrow, relative to the outer casing unit 33.

On the outer side facing away from the retaining profile 51, a pyroelectric actuator (pyro switch) 6 is mounted on the engagement part 34, viz., by means of a mounting element 61 and a holder 62. The actuator 6 has a carrier pin 63, which is guided transversely to the longitudinal axis through an opening 342 in the engagement element 34 and through the slot 52 in the retaining profile 5. In the event of an ignition of the actuator 6, the carrier pin 63 is abruptly moved in the direction away from the inner casing tube 31 and only reaches through the engagement opening 565 of the energy absorption element 56, whereby it disengages with the energy absorption element 54. The energy absorption element 56 is thus coupled with the engagement part 34 only by way of the carrier 341 of the engagement part. As a result of the engagement part 34 and the locking part 46 being connected to one another non-displaceably in the longitudinal direction in the normal state, the energy absorption element 54 is thus decoupled from the force flow between the inner casing tube 31 and the outer casing unit 33, when the latter are moved toward each other in the longitudinal direction in the event of a crash. It is also conceivable and possible that the energy absorption element 54 be coupled in by means of the abrupt movement of the carrier pin 63, but this poses the risk that the carrier pin 63 would be jammed during the abrupt movement and the coupling-in can thus not be carried out. The decoupling and coupling-in take place in the event of a frontal vehicle collision—also called crash. In doing so, the decision as to whether the energy absorption element 54 is coupled or decoupled is made based upon the characteristics prevailing at the instant of the crash—for example, whether the vehicle driver is buckled up or not.

Figure 8:
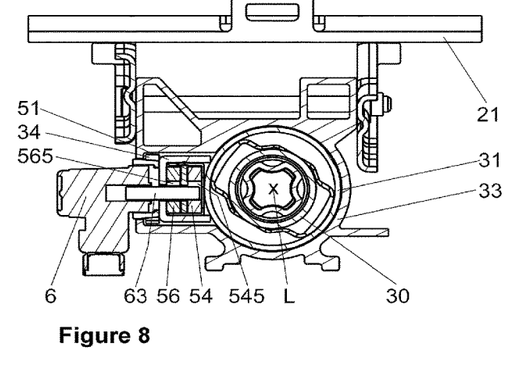
FIG. 8 is a cross-sectional view taken across line C-C through a steering column according to FIG. 4 or FIG. 5, in a first operating state.
Figure 9:
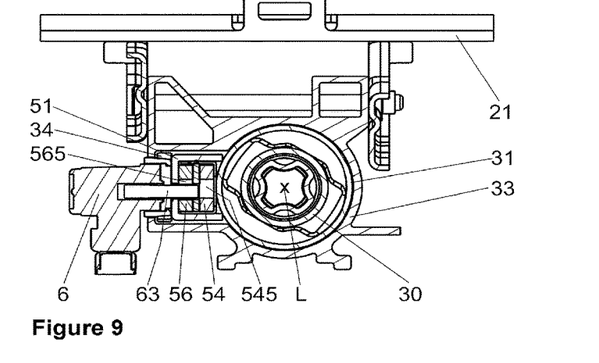
FIG. 9 is a cross-sectional view taken across line C-C through a steering column as in FIG. 8, in a second operating state.

This function can clearly be seen in cross-section in FIGS. 8 and 9. FIG. 8 shows the normal state, in which the carrier pin 63 is immersed in the engagement openings 565 and 545 of the energy absorption elements 56 and 54. In the event of a crash, the first energy absorption element 56 and the second energy absorption element 54 would, accordingly, be deformed. This would, for example, be the case if the vehicle driver were not buckled up at the instant of the crash, since, as a result of the coupling-in of the two energy absorption elements 54 and 56, a higher energy can be absorbed, which is introduced into the steering column 1 by the unbuckled vehicle driver. In the event of an activation of the pyroelectric actuator 6, the situation shown in FIG. 9 arises, wherein the carrier pin 63 was pulled out of the engagement opening 545 of the energy absorption element 54, and the latter was thus not deformed in the crash event. In this way, varying crash degrees can be activated as needed in the event of a crash by activating the actuator 6.

Figure 5:
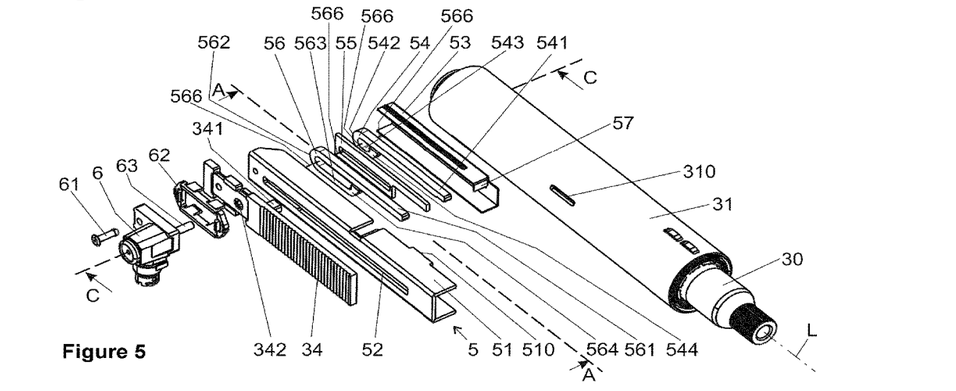
FIG. 5 is an exploded view of an example energy absorption device of a steering column according to FIGS. 1 through 4.
Figure 10:
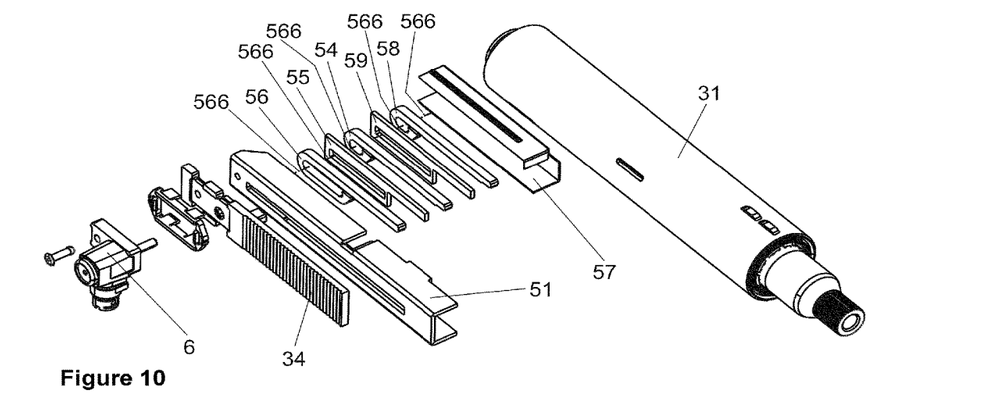
FIG. 10 is an exploded view of another example energy absorption device.

In the further embodiment of the invention shown in FIG. 10 in the same view as in FIG. 5, an additional (third) energy absorption element 58 is also mounted, by inserting an additional separating element 59 in a stack-shaped or sandwich-like arrangement in the retaining profile 51 on one side of the inner casing tube 31. By activating an appropriately designed pyrotechnical actuator 6, different configurations of the energy absorption elements 54, 56, and/or 58 can thus be coupled in or decoupled if needed, and more than two different crash degrees can thus be activated.

In an alternative embodiment not shown, a separate pyrotechnical actuator is provided for the third energy absorption element 58.

Owing to the invention, the steering column 1 can be provided with a single energy absorption device 5 that permits the activation of varying crash degrees, with lower manufacturing costs, in a particularly compact and cost-effective manner.

LIST OF REFERENCE SYMBOLS

1 Steering column
2 Console
21 Mounting means
22, 23 Side walls
24 Swing arm
25 Swivel axis
30 Steering spindle
31 (Inner) casing tube
310 Accommodation openings
32 End 33 (Outer) casing unit
34 Engagement part
341 Carrier
342 Opening
4 Clamping device
41 Clamping lever
42 Clamping bolt
43 Elongated hole
44, 45 Cam disks
46 Locking part
47 Opening
48 Teeth
49 Spring
5 Energy absorption device
51 Retaining profile
510 Form-fit elements
52 Slot
53 Inner profile
54, 56 Energy absorption element
541, 561 First leg
542, 562 Bend
543, 563 Second leg
544, 564 Carrier hook
545, 565 Engagement opening
566 Bending axis
55, 59 Separating element
57 Counter bearing
58 Energy absorption element
6 Pyroelectric actuator
61 Mounting element
62 Holder
63 Carrier pin
L Longitudinal axis

What is claimed is:

1. A steering column for a motor vehicle comprising:
an inner casing tube;
a steering spindle mounted rotatably in the inner casing tube about a longitudinal axis of the steering spindle;
an outer casing unit in which the inner casing tube is held, the outer casing unit being directly or indirectly connectable to a body of the motor vehicle;
a clamping device, wherein in a fixing position the clamping device affixes the outer casing unit relative to the inner casing tube, wherein in a release position the clamping device permits adjustment of the inner casing tube relative to the outer casing unit at least in a longitudinal direction, the clamping device comprising a locking part that is supported in the longitudinal direction on the outer casing unit, wherein in the fixing position the locking part is connected non-displaceably in the longitudinal direction to an engagement part connected to the inner casing tube, wherein in the release position the locking part is released from the engagement part and permits movement of the inner casing tube relative to the outer casing unit in the longitudinal direction; and
an energy absorption device coupling the inner casing tube and the outer casing unit, the energy absorption device including a first energy absorption element and a second energy absorption element that are positioned in a radial direction with respect to the longitudinal axis of the steering spindle on a same side of the inner casing tube, at least one of which is configured to be coupled-in between the inner casing tube and the engagement part, wherein in the fixing position of the clamping device the at least one of the first or second energy absorption elements is coupled-in between the inner casing tube and the engagement part and is plastically deformable during a displacement of the inner casing tube relative to the outer casing unit,
wherein the energy absorption device further comprises an adjustment device with a movable coupling element that couples or decouples the at least one of the first or second energy absorption elements between the inner casing tube and the engagement part when the adjustment device is activated.

2. The steering column of claim 1 wherein the first and second energy absorption elements are positioned in a sandwich manner with the first energy absorption element being adjacent to the second energy absorption element.

3. The steering column of claim 1 further comprising a separating element disposed between the first and second energy absorption elements.

4. The steering column of claim 1 wherein the first and second energy absorption elements are disposed in a common housing.

5. The steering column of claim 1 wherein at least one of the first energy absorption element or the second energy absorption element is configured as an elongated bending element having a first leg and a second leg that are connected by way of a bend, wherein the first leg is configured to be affixed to the engagement part and the second leg is configured to be supported in the longitudinal direction on the inner casing tube.

6. The steering column of claim 5 further comprising an anti-friction coating disposed on at least one of the elongated bending element, a common housing containing the first and second energy absorption elements, or a separating element disposed between the first and second energy absorption elements.

7. The steering column of claim 1 wherein the adjustment device comprises a pyroelectric actuator that is actuatable to pyrotechnically drive the movable coupling element.

8. The steering column of claim 1 wherein the movable coupling element is configured as a carrier pin that is movable transversely to the longitudinal axis of the steering spindle through an opening in the engagement part for coupling—in or decoupling the at least one of the first or second energy absorption elements between the inner casing tube and the engagement part, wherein the movable coupling element is configured to be brought into or out of operative engagement with a leg of an elongated bending element.

9. The steering column of claim 1 wherein the outer casing unit is held in a console that is configured to be affixed to the motor vehicle.

* * * * *